(12) United States Patent
Li et al.

(10) Patent No.: US 8,805,209 B2
(45) Date of Patent: Aug. 12, 2014

(54) EFFICIENT COMPUTATION AND COMPENSATION OF LINEAR AND NONLINEAR DISTORTION IN DISPERSION-MANAGED FIBER-OPIC TRANSMISSION

(75) Inventors: Guifang Li, Oviedo, FL (US); Likai Zhu, Orlando, FL (US)

(73) Assignee: University of Central Florida Research Foundation, Inc.

( * ) Notice: Subject to any disclaimer, the term of this patent is extended or adjusted under 35 U.S.C. 154(b) by 19 days.

(21) Appl. No.: 13/404,770

(22) Filed: Feb. 24, 2012

(65) Prior Publication Data
US 2012/0219303 A1    Aug. 30, 2012

Related U.S. Application Data

(60) Provisional application No. 61/446,322, filed on Feb. 24, 2011.

(51) Int. Cl.
*H04B 10/06* (2006.01)
(52) U.S. Cl.
USPC ........... 398/208; 398/140; 398/158; 398/159; 398/202; 398/81; 398/192; 398/182
(58) Field of Classification Search
None
See application file for complete search history.

(56) References Cited

U.S. PATENT DOCUMENTS

2009/0214215 A1* 8/2009 Li et al. .................. 398/81

OTHER PUBLICATIONS

Xun Li; Xingzhong Chen; Qasmi, M., "A broad-band digital filtering approach for time-domain Simulation of pulse propagation in optical fiber," Lightwave Technology, Journal of, vol. 23, No. 2, pp. 864,875, Feb. 2005.*
Liang B. Du and Arthur J. Lowery, "Improved single channel backpropagation for intra-channel fiber nonlinearity compensation in long-haul optical communication systems," Opt. Express 18, 17075-17088 (2010).*
Ip, E.M.; Kahn, J.M., "Fiber Impairment Compensation Using Coherent Detection and Digital Signal Processing," Lightwave Technology, Journal of, vol. 28, No. 4, pp. 502,519, Feb. 15, 2010.*

* cited by examiner

*Primary Examiner* — Ken Vanderpuye
*Assistant Examiner* — Merlin Brito Peguero
(74) *Attorney, Agent, or Firm* — Thomas | Horstemeyer, LLP (57) ABSTRACT

In one embodiment, a method for performing nonlinearity compensation on a dispersion-managed optical signal that was transmitted over an optical communication link, the method including virtually dividing the communication link into a plurality of steps, performing lumped dispersion compensation on a received optical signal to obtain a waveform upon which digital backward propagation (DBP) can be performed, performing DBP by performing dispersion compensation and nonlinearity compensation for each step, and generating an estimate of the transmitted signal based upon the performed DBP.

14 Claims, 9 Drawing Sheets

EFFICIENT COMPUTATION AND COMPENSATION OF LINEAR AND NONLINEAR DISTORTION IN DISPERSION-MANAGED FIBER-OPIC TRANSMISSION

CROSS-REFERENCE TO RELATED APPLICATION

This application claims priority to U.S. provisional application entitled, "Efficient Computation And Compensation Of Linear And Nonlinear Distortion In Dispersion-Managed Fiber-Optic Transmission," having Ser. No. 61/446,322, filed Feb. 24, 2011, which is entirely incorporated herein by reference.

BACKGROUND

Optical signals are distorted by the joint effects of dispersion and nonlinearity during their propagation in optical fiber. In most installed long-haul fiber communication systems, dispersion is typically compensated by periodically cascading two or more kinds of fiber with inverse dispersion parameters. With the advent of new inverse dispersion fibers (IDFs), wide-band dispersion flatness has been obtained by compensating for both dispersion and dispersion slope while minimizing the total polarization mode dispersion (PMD). In emerging coherent communication systems, dispersion can also be compensated using digital signal processing (DSP). As the technology of dispersion compensation matures, fiber nonlinearity effects, including self-phase modulation (SPM), cross-phase modulation (XPM), and four-wave mixing (FWM), become the limiting factor to further increase the spectral efficiency and transmission distance of long-haul fiber communication systems.

Methods such as optimized dispersion management, large effective area fiber, and new modulation formats have been investigated and employed in order to mitigate nonlinear effects. In addition to methods that mitigate nonlinearity, methods of compensating nonlinear impairments have been proposed. In dispersion-shifted fibers, nonlinear phase shift can be compensated with lumped nonlinear phase de-rotation based on the assumption that the intensity waveform remains unchanged throughout fiber propagation. However, lumped nonlinearity compensation performs poorly where there is significant interaction between nonlinearity and dispersion. In addition, nonlinearity pre-compensation at the transmitter side has been proposed for direct-detection systems.

Enabled by coherent detection, nonlinearity post-compensation via digital backward propagation (DBP) has attracted significant attention. Examples of DBP are described in U.S. Pub. No.: 20100239270, U.S. Pub. No.: 20100239262, U.S. Pub. No.: 20100239261, U.S. Pub. No.: 20100239254, and U.S. Pub. No.: 20090214215, each of which is incorporated by reference herein. DBP is typically implemented using the split-step method (SSM). Conventional digital backward propagation by means of the split-step method is based on the virtual division of the total transmission distance into short steps. In each step, the fiber dispersion is compensated with a linear operation, and the fiber nonlinearity is compensated with a nonlinear phase rotation which is usually proportional to the fiber nonlinear parameter γ, the optical intensity, and the effective fiber length of the step. In order for the split-step method to be accurate, a large number of steps are needed, especially for inter-channel nonlinearity compensation of WDM systems, resulting in a prohibitive computational load. In view of the computational intensity associated with split-step DBP, it would be desirable to have a more efficient method for compensating for fiber nonlinearity.

BRIEF DESCRIPTION OF THE DRAWINGS

The disclosed embodiments can be better understood with reference to the following figures. It is noted that the components illustrated in the figures are not necessarily drawn to scale.

FIGS. 9(a) and (9b) are graphs that plot Q-value versus RDPS, and Q-value versus step number after dispersion-folded DBP, respectively.

DETAILED DESCRIPTION

Introduction

As described above, current digital backward propagation (DBP) compensation for dispersion-managed fiber-optic transmission systems is computationally intensive. Disclosed herein are more efficient methods of estimating and compensating linear (dispersion) and nonlinear (Kerr nonlinearity) impairments for dispersion-managed fiber-optic transmission systems that take advantage of the periodic behavior of optical signals. As described below, greater efficiency can be obtained when a "folded" split-step method (SSM) is used to estimate the linear and nonlinear impairments and "folded" DBP is used to compensate the linear and nonlinear impairments for dispersion-managed fiber-optic transmission systems. In some embodiments, distance-folded DBP can be performed. In other embodiments, dispersion-folded SSM or DBP can be performed.

Theory of Distance-Folded SSM/DBP

Without loss of generality, it can be assumed that, in a dispersion-managed fiber-optic transmission system, each fiber span with a length of L is a period of a dispersion map. For long-haul fiber-optic transmission, an optimum power exists as a result of the trade-off between optical signal to noise ratio (OSNR) and nonlinear impairments. The total nonlinear phase shift at the optimum power level is on the order of 1 radian. Therefore, for long distance (e.g., transoceanic) fiber transmission systems that comprise many (e.g., greater than 100) amplified spans, the nonlinear effects in each span are weak. As a result, chromatic dispersion is the dominant factor that determines the evolution of the waveform within each span.

The nonlinear behavior of the optical signal can be analyzed using a perturbation approach. The nonlinear Schrödinger equation (NLSE) governing the propagation of the optical field, $A_j(z,t)$, in the $j^{th}$ fiber span can be expressed as $$\frac{\partial A_j(z,t)}{\partial z} = [D + \varepsilon \cdot N(|A_j(z,t)|^2)] \cdot A_j(z,t), \quad \text{Equation (1)}$$

where $0 < z < L$ is the propagation distance within each span, $D$ is the linear operator for dispersion, fiber loss, and amplifier gain, and $N(|A_j(z,t)|^2)$ is the nonlinear operator. $\varepsilon$ (to be set to unity) is a parameter indicating that the nonlinear perturbation is small for the reasons given above. The boundary conditions are $$A_1(0,t) = a(0,t), \quad \text{Equation (2)}$$

$$A_j(0,t) = A_{j-1}(L,t) \text{ for } j \geq 2, \quad \text{Equation (3)}$$

where $a(0,t)$ is the input signal at the beginning of the first span. It can be assumed that the solution of Equation (1) can be written as, $$A_j(z,t) = A_{j,l}(z,t) + \varepsilon \cdot A_{j,nl}(z,t). \quad \text{Equation (4)}$$

Substituting Equation (4) into Equation (1) and expanding the equation in power series of $\varepsilon$ yields $$\frac{\partial A_{j,l}(z,t)}{\partial z} - D \cdot A_{j,l}(z,t) + \varepsilon \cdot \left[\frac{\partial A_{j,nl}(z,t)}{\partial z} - D \cdot A_{j,nl}(z,t) - N(|A_{j,l}(z,t)|^2) \cdot A_{j,l}(z,t)\right] + O(\varepsilon^2) = 0. \quad \text{Equation (5)}$$

Equating to zero, the successive terms of the series yields $$\frac{\partial A_{j,l}(z,t)}{\partial z} = D \cdot A_{j,l}(z,t), \quad \text{Equation (6)}$$

$$\frac{\partial A_{j,nl}(z,t)}{\partial z} = D \cdot A_{j,nl}(z,t) + N(|A_{j,l}(z,t)|^2) \cdot A_{j,l}(z,t). \quad \text{Equation (7)}$$

The boundary conditions are $$A_{1,l}(0,t) = a(0,t), \quad \text{Equation (8)}$$

$$A_{j,l}(0,t) = A_{j-1}(L,t) \text{ for } j \geq 2, \quad \text{Equation (9)}$$

and $$A_{j,nl}(0,t) = 0. \quad \text{Equation (10)}$$

First, it is assumed that dispersion is completely compensated in each span. As a result, at the end of the first span, $$A_{1,l}(L,t) = a(0,t), \quad \text{Equation (11)}$$

And $$A_2(0,t) = A_1(L,t) = a(0,t) + \varepsilon \cdot A_{1,nl}(L,t), \quad \text{Equation (12)}$$

where $A_{1,nl}(z,t)$ is the solution of Eq. (7) with $j=1$. For the second span, $$A_{2,l}(z,t) = A_{1,l}(z,t) = A_{1,l}(z,t) + \varepsilon \cdot \overline{A}(z,t), \quad \text{Equation (13)}$$

where the first and second terms are solutions to Equation (6) with boundary conditions $A_{2,l}(0,t) = a(0,t)$ and $A_{2,l}(0,t) = \varepsilon \cdot A_{1,nl}(L,t)$, as a result of the principle of superposition. At the end of the second span, because of the complete dispersion compensation, $$A_{2,l}(L,t) = a(0,t) + \varepsilon \cdot A_{1,nl}(L,t). \quad \text{Equation (14)}$$

The nonlinear distortion in the second span is governed by Equation (7) with $j=2$. Since $$|A_{2,l}|^2 = |A_{1,l} + \varepsilon \cdot \overline{A}|^2 = |A_{1,l}|^2 + O(\varepsilon), \quad \text{Equation (15)}$$

the differential equation and the boundary conditions for $A_{2,nl}(z,t)$ and $A_{1,nl}(z,t)$ are identical, so $$A_{2,nl}(L,t) = A_{1,nl}(L,t). \quad \text{Equation (16)}$$

As a result, the optical field at the end of the second span is given by $$A_2(L,t) = A_{2,l}(L,t) + \varepsilon \cdot A_{2,nl}(L,t) = a(0,t) + \varepsilon \cdot A_{1,nl}(L,t). \quad \text{Equation (17)}$$

That is, the nonlinear distortion accumulated in 2 spans is approximately the same as nonlinear distortion accumulated in 1 span with the same dispersion map and twice the nonlinearity. It follows that, assuming weak nonlinearity and periodic dispersion management, the optical field after K spans of propagation can be written as $$A_N(L,t) = a(0,t) + \varepsilon \cdot K A_{1,nl}(L,t), \quad \text{Equation (18)}$$

which is the solution of the NLSE $$\frac{\partial A_j(z,t)}{\partial z} = [D + \varepsilon \cdot K N(|A_j(z,t)|^2)] \cdot A_j(z,t). \quad \text{Equation (19)}$$

Equation (19) describes the fiber propagation in a fiber span where the nonlinearity is K times of that in the original fiber.

The equivalence described above suggests that modeling of optical signal transmission in fiber from the transmitter to the receiver using SSM for K spans can be folded into a single span with the same dispersion map and K times the nonlinearity for dispersion-managed fiber-optic transmission systems. Assuming that the step size for the SSM is unchanged, the computational load for the folded SSM can be reduced by the folding factor of K. This method is referred to herein as "distance-folded" SSM.

The equivalence described above also suggests that compensation of linear and nonlinear impairments accumulated in the received signal using DBP for K spans can be folded into a single span with the same dispersion map and K times the nonlinearity modeling of optical signal transmission in fiber from the transmitter to the receiver. Assuming that the step size for the split-step implementation of DBP is unchanged, the computational load for the folded DBP can be reduced by the folding factor of K. This method is referred to herein as "distance-folded" DBP. The above derivation is based on the assumption that waveform distortion due to nonlinearity and the residual dispersion per span (RDPS) is negligible, and consequently the nonlinear behavior of the signal repeats itself in every span. This assumption may not be precisely valid because fiber nonlinearity may change the waveform and because dispersion is not perfectly periodic if the RDPS is non-zero or higher-order dispersion (dispersion slope) is not compensated. These effects accumulate and as a result, the waveform evolutions are not identical between two spans that are far away from each other.

In the discussion that follows, emphasis is placed on compensation of linear and nonlinear impairments first on the receiver side using folded DBP and second on the transmitter side as computational efficiency is more important for this application. In receiver-side impairment compensation using DBP, the optical signal suffering impairments from fiber-optic transmission is first coherently detected and the complex coherently-detected signal is propagated backward in the digital domain in a virtual fiber whose dispersion and nonlinearity parameter are opposite to the physical transmission fiber. If no noise is present, DBP can restore the transmitted signal.

In order for the nonlinearity compensation to be more accurate, the entire long-haul transmission system can be divided into segments of multiple dispersion-managed spans so that the accumulated nonlinear effects and residual dispersion are small in each segment. Moreover, in order to minimize the error due to residual dispersion, distance-folded DBP can be performed with a boundary condition calculated from lumped dispersion compensation for the first half of the segment.

Figure 1:
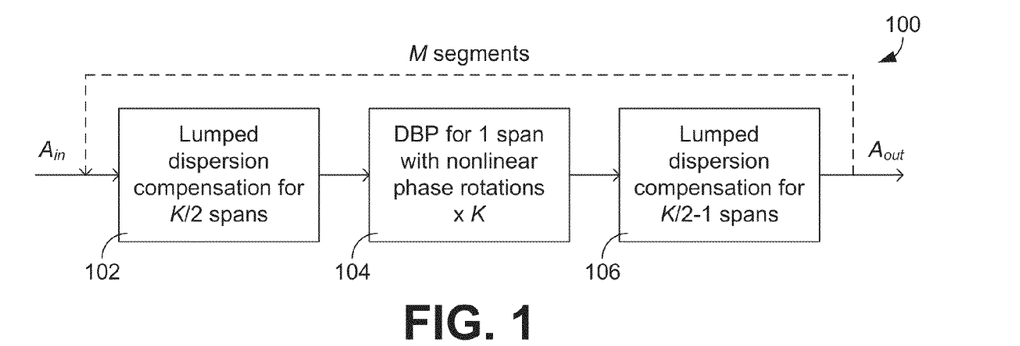
FIG. 1 is a block diagram that illustrates an embodiment of a method for performing distance-folded DBP for a periodically dispersion-managed fiber link having M×K spans.

An embodiment of a method 100 for performing distance-folded DBP for a communication link with M×K spans is illustrated in FIG. 1. As is shown in that figure, the method comprises the steps of performing lumped dispersion compensation for the first half of spans of a segment (i.e., K/2 spans), as indicated in block 102, performing DBP on one of the spans of the segment (e.g., a central span) with K times nonlinearity, as indicated in block 104, and then performing lumped dispersion compensation for the remaining spans of the segment (i.e., K/2−1 spans), as indicated in block 106. Those steps can then be performed for the next segment in the communication link and so forth until DBP has been performed in relation to every segment in the link. Through such a process, the number of computations is significantly reduced.

Figure 2A:
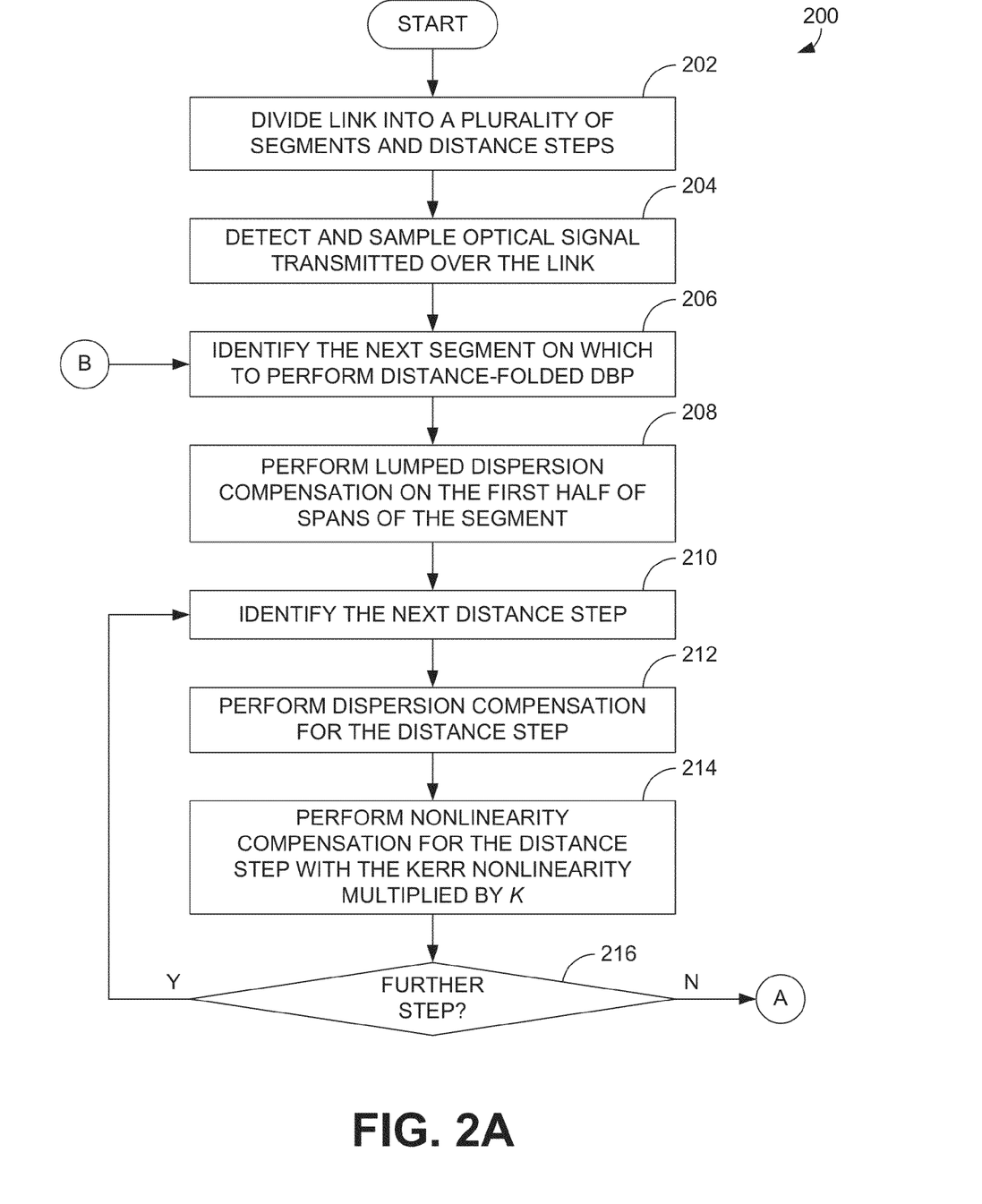
FIGS. 2A and 2B are flow charts of an embodiment of a method for performing distance-folded DBP for a periodically dispersion-managed fiber link having M×K spans.

FIGS. 2A and 2B illustrate a method 200 for performing digital signal processing in a communication link with a coherent receiver employing distance-folded DBP. Beginning with block 202 of FIG. 2A, the communication link is virtually divided into a plurality of segments and distance steps. The number of segments, M, and the number of distance steps, n, that the communication link is divided into depends upon various factors, such as the length of the link and the characteristics of the fibers used in the link. Regardless, each segment comprises multiple (K) spans (which each includes at least one length of optical fiber that extends to or from an optical amplifier) and the fiber(s) of each span is/are divided into multiple distance steps. In dispersion-managed communication links, each span can comprise a first length of optical fiber having a first dispersion characteristic and a second length of optical fiber having an inverse dispersion characteristic so that, to the extent possible, dispersion along the span is optically minimized. In most cases, however, residual dispersion remains and accumulates from span to span.

Figure 10:
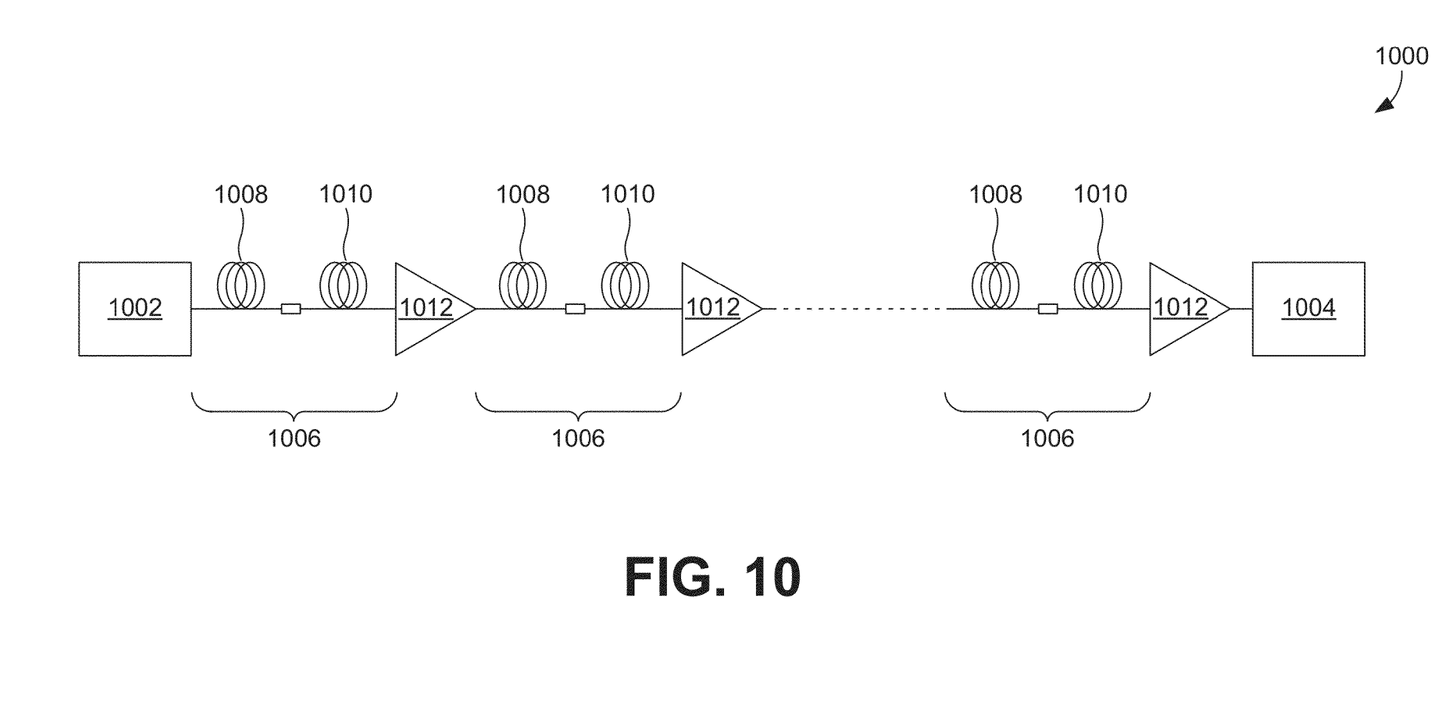
FIG. 10 is a block diagram of an example dispersion-managed communication link or system.

FIG. 10 illustrates an example dispersion-managed communication link or system 1000. The system 1000 comprises a transmitter 1002, a receiver 1004, and multiple spans 1006. Each span 1006 comprises a first length of optical fiber 1008 and a second length of optical fiber 1010. Separating each span 1006 is an optical amplifier 1012 that amplifies the optical signals carried along the span. As described above, each segment comprises multiple spans 1006, and each span is virtually divided into multiple distance steps, which each comprises a fraction of the distance along the span.

Referring next to block 204 of FIG. 2A, an optical signal transmitted over the communication link is detected and sampled by the receiver. The "next" segment on which distance-folded DBP is to be performed can then be identified, as indicated in block 206. If the distance-folded DBP process has just begun, the next segment will be the first segment, i.e., the segment nearest the receiver. With reference to block 208, lumped dispersion compensation is performed for the first half of the K spans (i.e., K/2 spans) to determine the boundary condition for the waveform on which DBP is to be performed. By way of example, if the first segment comprises ten spans with the first span being the span closest to the receiver, lumped dispersion compensation is performed for spans 1-5 of the segment to account for the residual dispersion from the first five spans.

Turning next to block 210, the "next" distance step of the subsequent span of the segment is identified. If the distance-folded DBP process has just begun for the current segment, the next step will be the first step of the subsequent span nearest the receiver. With reference to block 212, dispersion compensation is then performed for the distance step and, with reference to block 214, nonlinearity compensation is performed for the distance step with the Kerr nonlinearity within the step being multiplied by K. In keeping with the previous example, if lumped dispersion compensation was performed for spans 1-5 of a segment comprising ten spans, nonlinearity compensation can be performed on the first step of span 6 of the segment and the Kerr nonlinearity would be multiplied by a factor of ten to account for each of the ten spans of the segment.

Flow from block 214 depends upon whether all distance steps of the span have been considered. With reference to decision block 216, if there are other distance steps of the span to consider, flow returns to block 210 and the next distance step of the span is identified. This process continues until every distance step of the span has been accounted for. Once the dispersion and nonlinearity of the last distance step of the span has been compensated, flow continues on to block 218 of FIG. 2B at which lumped sum dispersion compensation is performed for the remaining spans of the segment (i.e., K/2−1). In keeping with the above-described example, the lumped sum dispersion would be performed for spans 7-10 to determine the boundary condition for the waveform at the end of the segment (from the perspective of the receiver).

Figure 2B:
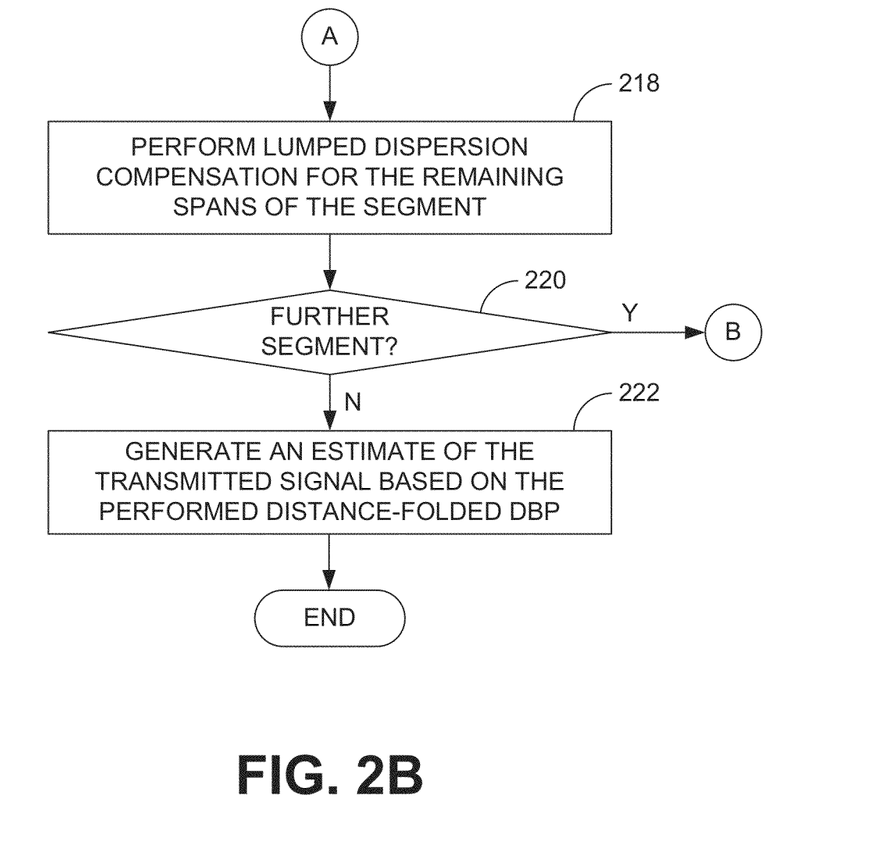

As indicated in decision block 220, flow from this point depends upon whether there is another segment to consider. If so, flow returns to block 206 and the above-described process is repeated for the next segment (i.e., next segment farther away from the receiver). For instance, if distance-folded DBP was performed on only the first segment (i.e., segment closest to the receiver) of the link, flow would return to block 206 so that distance-folded DBP could be similarly performed on the second segment of the communication link.

Flow continues in the manner described above until distance-folded DBP has been performed in relation to each segment of the communication link. At that time, flow continues to block 222 at which an estimate of the transmitted signal is generated based on the distance-folded DBP that had been performed on each segment. Such estimation can comprise matched filtering, clock recovery, and phase estimation.

Simulation Results Using Distance-Folded DBP

Figure 3:
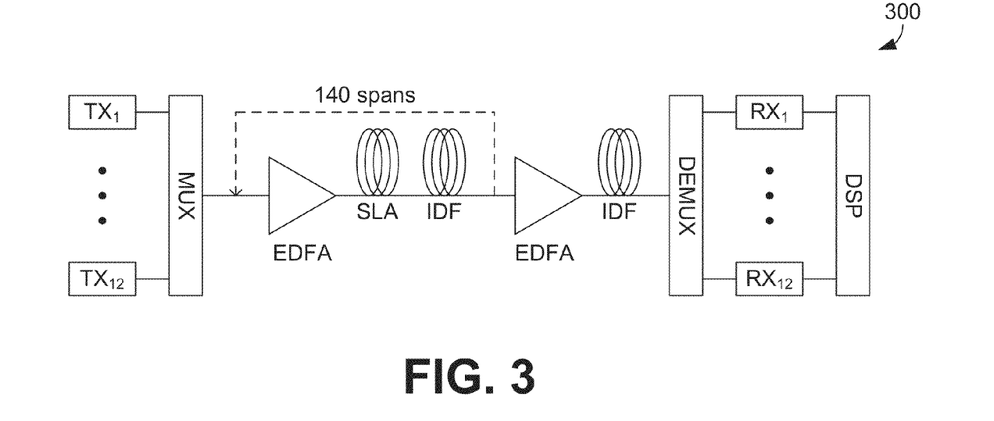
FIG. 3 is a block diagram of an embodiment of a dispersion-managed wavelength division multiplexed system.

A wavelength division multiplexed (WDM) system with quadrature phase-shift keying (QPSK) modulation at a bit rate of 56 Gbits/s using VPItransmissionMaker was simulated to test the above-described methodology. The simulation setup is shown in FIG. 3. Twelve channels of non-return-to-zero (NRZ) QPSK signal were transmitted with 50 GHz channel spacing. The line width of the lasers was 100 KHz. The dispersion-managed fiber link consisted of 140 spans of 50 km of the OFS UltraWave SLA/IDF Ocean Fiber combination. In each span, the SLA fiber with a large effective area was used near the erbium doped fiber amplifier (EDFA), followed by the IDF fiber with inverse dispersion and dispersion slope. The EDFA noise figure was 4.5 dB. The loss, dispersion, relative dispersion slope, and effective area of the SLA fiber were 0.188 dB/km, 19.5 ps/nm/km, 0.003/nm, and 106 μm², respectively. The corresponding parameters for the IDF fiber were 0.23 dB/km, −44 ps/nm/km, 0.003/nm, and 31 μm², respectively. The RDPS was determined by the proportion of SLA fiber to IDF fiber in each span. A piece of fiber at the receiver was used to compensate for the residual dispersion. After demultiplexing and coherent detection, DBP was performed in Matlab.

The DBP was performed as illustrated in FIG. 1. Without loss of generality, the coupled NLSE with the non-iterative asymmetric split-step Fourier method (SSFM) were solved. After matched filtering, phase estimation, and clock recovery, the Q-value averages of the WDM channels were estimated.

Figure 4:
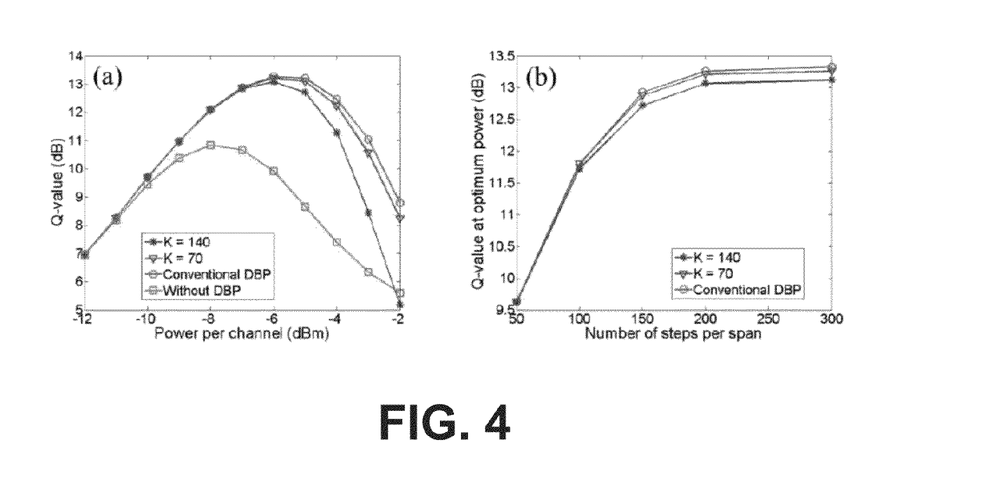
FIGS. 4(a) and 4(b) are graphs that plot Q-value versus launching power per channel, and Q-value at optimum power versus folding factor K with RDPS=0 ps/nm, respectively.

The transmission with full inline dispersion compensation, i.e., RDPS=0 was first simulated. The Q-value as a function of the launching power is shown in FIG. 4(a). Without nonlinearity compensation, the maximum Q-value was 10.8 dB. With conventional DBP in all spans, the Q-value was increased to 13.3 dB. With distance-folded DBP with a folding factor of 140 (i.e., M=1, K=140) the maximum Q-value was 13.1 dB. The 0.2 dB Q-value penalty was due to the accumulated nonlinear waveform distortion which reduced the accuracy of nonlinearity compensation. There was almost no penalty when the folding factor was 70 (i.e., M=2, K=70).

In the split-step implementation DBP, the step size is selected so as to be small enough so that the dispersion and nonlinear effects can be properly decoupled. In long-haul WDM fiber links, the step size is usually limited by dispersion. In each fiber span, the same number of steps in SLA fiber and IDF fiber were used so that the dispersion in each step was approximately the same. FIG. 4(b) shows the Q-value as a function of step number per span. The computationally efficient method did not reduce the required step size.

Figure 5:
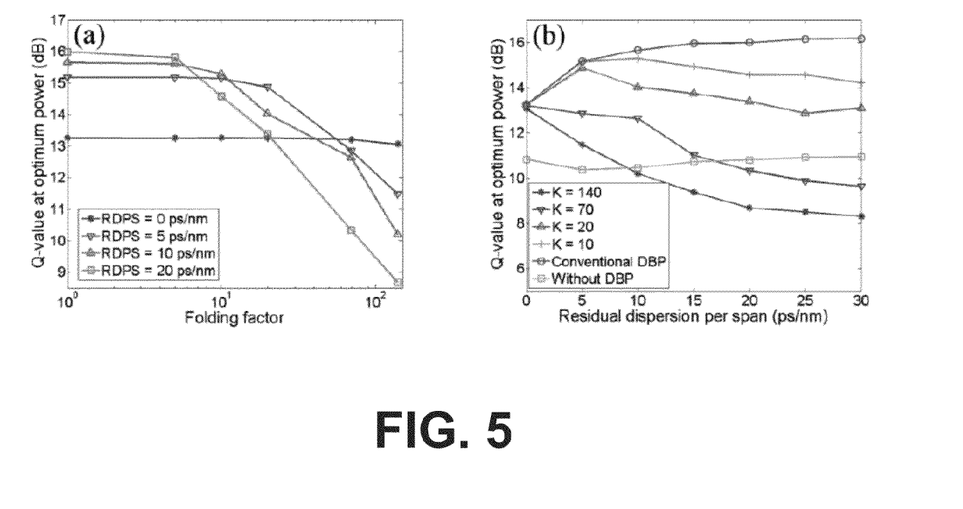
FIGS. 5(a) and 5(b) are graphs that plot Q-value versus folding factor K, and Q-value versus RDPS, respectively.

Although the nonlinear impairments of a dispersion-managed fiber link can be suppressed with inline residual dispersion, non-zero RDPS can induce penalty in the distance-folded DBP. FIG. 5(a) shows the Q-values obtained at optimum power levels as functions of the folding factor. With a RDPS of 5 ps/nm (20 ps/nm), the maximum Q-value can be approached using a folding factor of 20. FIG. 5(b) shows the Q-values as functions of the RDPS. With conventional DBP in all spans, the Q-value increases with RDPS and approaches the maximum value when RDPS is larger than 10 ps/nm. When distance-folded DBP is used, the Q-value penalty increases with RDPS. For a fiber link with non-zero RDPS, there is a trade-off between computational load and system performance.

Theory of Dispersion-Folded DBP

In cases where there is residual dispersion, distance-folded DBP may not optimal because optical waveforms do not repeat at identical spatial locations in all amplified spans. Since waveforms do repeat at locations where accumulated dispersions are identical, it suggests that DBP can be folded relative to accumulated dispersion rather than transmission distance. This type of DBP is referred to herein as "dispersion-folded" DBP.

Figure 6:
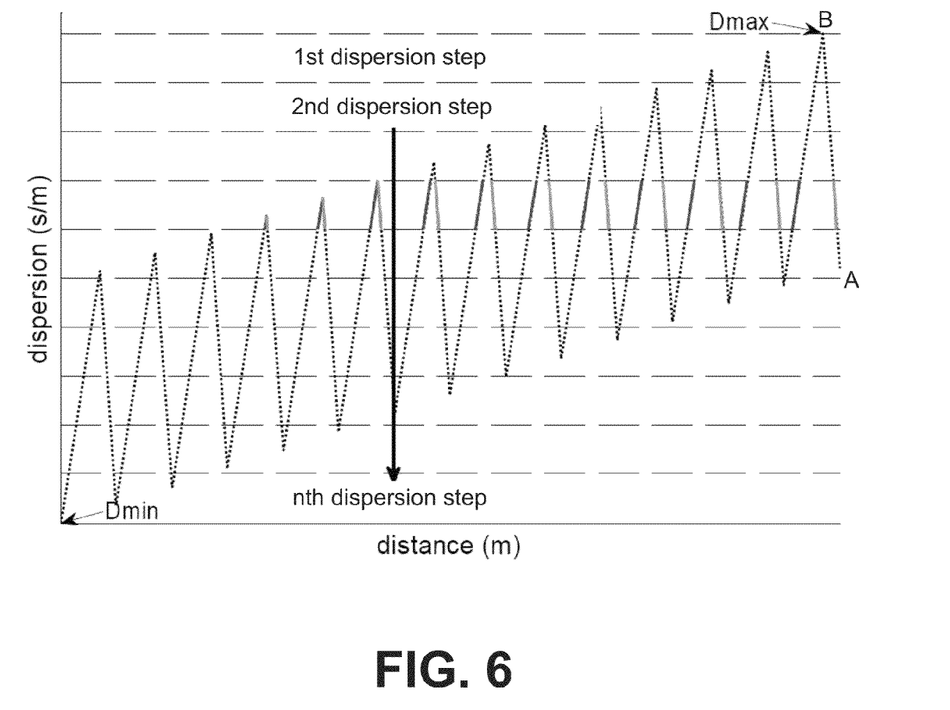
FIG. 6 is an example dispersion map of an example communication link that identifies dispersion steps used in dispersion-folded DBP.

The dispersion map of an example dispersion-managed communication link is shown in FIG. 6. In FIG. 6, the vertical axis is the accumulated dispersion and the horizontal axis is the distance of propagation. The dotted line is the dispersion map of the communication link and the solid lines are the fiber sections folded into one of the steps of the dispersion-folded DBP. Neglecting the waveform distortion due to nonlinearity, it can be assumed that the waveform is only dependent on the accumulated dispersion. Thus, the fiber sections that have the same accumulated dispersion can be folded into one step in the dispersion-folded DBP.

When the step size is dispersion limited, the dispersion map can be equally divided into n divisions or steps according to the accumulated dispersion, as shown with the parallel horizontal dashed lines in FIG. 6. The fiber sections in each division can be folded into one dispersion step of the dispersion-folded DBP. The fiber sections folded into $i^{th}$ dispersion step of dispersion-folded DBP are characterized with the accumulated dispersion given by $$\frac{i-1}{n}(D_{max} - D_{min}) < D < \frac{i}{n}(D_{max} - D_{min}), \qquad \text{Equation (20)}$$

where $D_{max}$ and $D_{min}$ are the maximum and minimum accumulated dispersion of the link.

As is apparent from FIG. 6, the fiber sections with the same accumulated dispersion may have different spatial locations along the amplified fiber spans. Consequently the different power levels of the fiber sections are taken into account when calculating the nonlinear phase rotation. The nonlinear phase rotation of the $q^{th}$ fiber section in the $i^{th}$ division can be calculated with $$\varphi_{i,q} = \gamma |A_i(z_1, t)|^2 \int_{z_1}^{z_2} \frac{P_{i,q}(z)}{P_{i,q}(z_1)} dz \qquad \text{Equation (21)}$$

where $z_1$ and $z_2$ are the beginning and end of the fiber section determined by Equation (20), γ is the fiber nonlinear parameter, $P_{i,q}$ is the optical power as a function of z within the fiber section, and $A_i(z_1,t)$ is the optical waveform at the beginning of the $i^{th}$ division. The total nonlinear phase rotation for the $i^{th}$ division is given by $$\varphi_i = \sum_q \varphi_{i,q} = \frac{|A_i(z_1, t)|^2}{P_{i,q}(z_1)} \cdot \sum_q \gamma \int_{z_1}^{z_2} P_{i,q}(z) dz. \qquad \text{Equation (22)}$$

A weighting factor $w_i$ for the $i^{th}$ step is defined by $$W_i = \sum_q \gamma \int_{z_1}^{z_2} P_{i,q}(z) dz. \qquad \text{Equation (23)}$$

Then at the $i^{th}$ step, the nonlinear phase rotation can be calculated from the multiplication of the normalized waveform $$\frac{|A_i(z_1, t)|^2}{P_{i,q}(z_1)}$$

and the weighting factor $w_i$, and is given by $$\varphi_i = \frac{|A_i(z_1, t)|^2}{P_{i,q}(z_1)} \cdot W_i \qquad \text{Equation (24)}$$

For n step dispersion-folded DBP of a given fiber link, $w_i$ are constant parameters that can be calculated from the dispersion map and fiber parameters. Thus, the calculation of $w_i$ does not require real-time computation.

The dispersion-folded DBP for K fiber spans can be started from the division with maximum accumulated dispersion as illustrated in FIG. 6. Lumped dispersion compensation from the end of the K fiber spans (point A in FIG. 6) to the location of maximum accumulated dispersion (point B in FIG. 6) is first performed. Under the weak nonlinearity assumption, the obtained waveform $A_1(z_1,t)$ is the waveform at point B, which is used for the first step of DBP. Then, split-step folded DBP is performed. The weighting factor $w_i$ is used in nonlinear phase rotation for the $i^{th}$ step.

Figure 7:
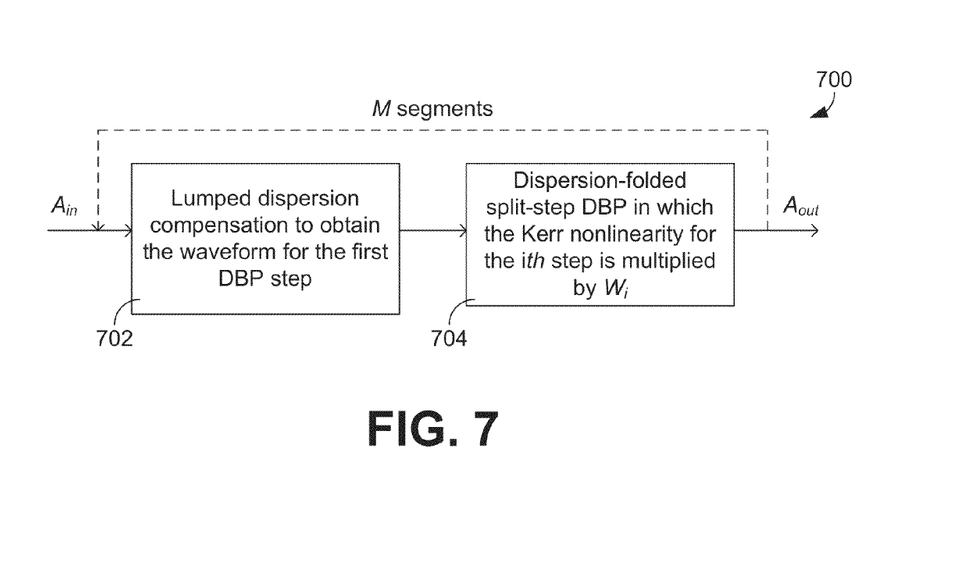
FIG. 7 is a block diagram that illustrates an embodiment of a method for performing dispersion-folded DBP for a periodically dispersion-managed fiber link with M×K spans.

The RDPS is taken into account in the dispersion-folded DBP method. In comparison with the distance-folded DBP, dispersion-folded DBP avoids the penalty from the waveform distortion due to accumulated residual dispersion, such as that shown in FIG. 6. However, in order to reduce the penalty due to the accumulated nonlinear waveform distortion, it may still be necessary to divide the whole fiber link into several segments. In each segment, DBP for multiple dispersion periods can be dispersion-folded as illustrated in FIG. 6. For a fiber link with M×K spans, the dispersion-folded DBP is illustrated in FIG. 7. As is shown in that figure, the method 700 comprises the steps of performing lumped dispersion compensation to obtain the waveform for the first DBP dispersion step, as indicated in block 702, and performing dispersion-folded split-step DBP with the nonlinearity for the $i^{th}$ step multiplied by $w_i$, as indicated in block 704. Those actions can then be performed for each step in the communication link. As with distance-folded DBP, the number of computations is significantly reduced.

Figure 8A:
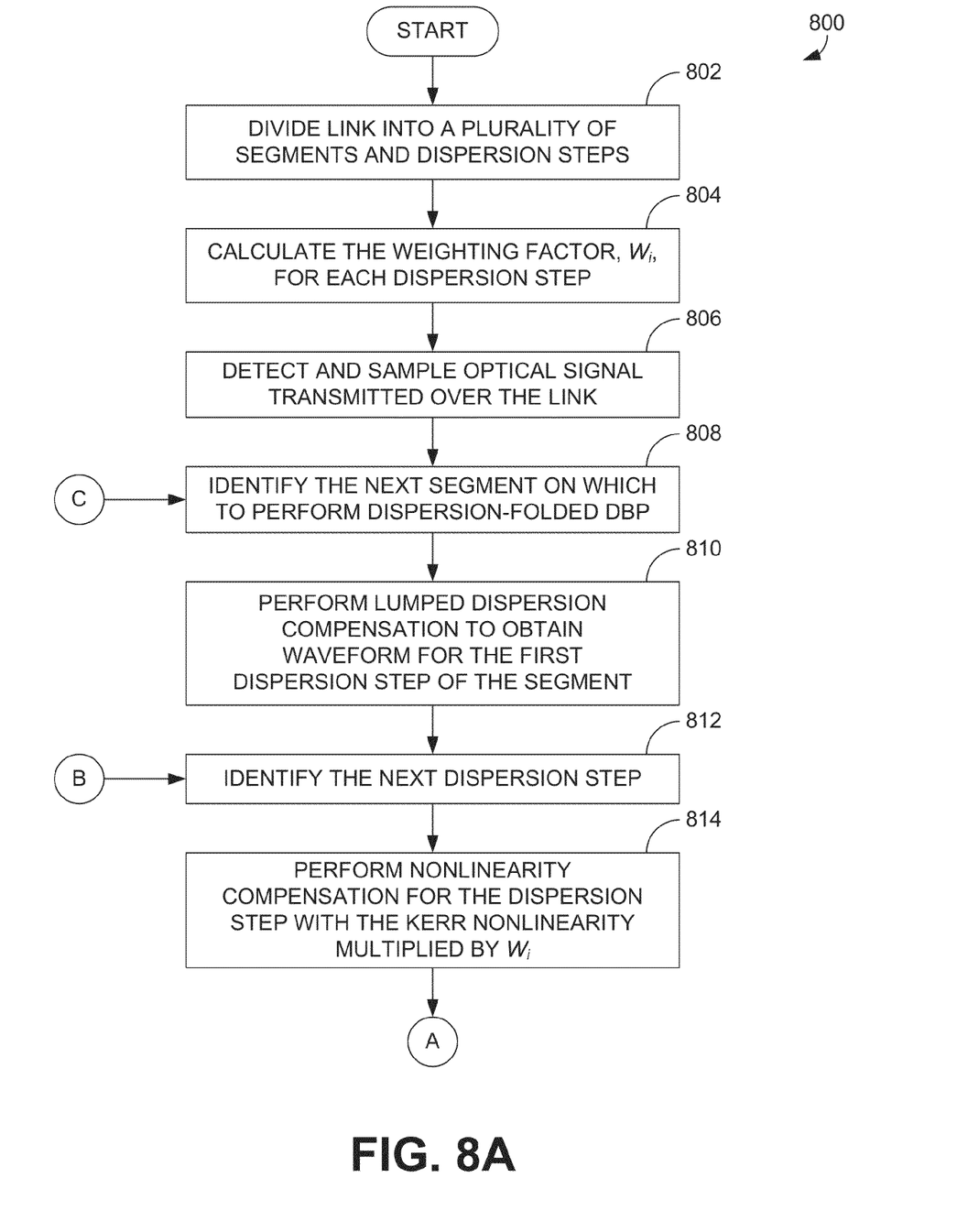
FIGS. 8A and 8B are flow charts of an embodiment of a method for performing dispersion-folded DBP for a periodically dispersion-managed fiber link with M×K spans.

FIGS. 8A and 8B illustrate a method 800 for performing digital signal processing in a communication link with a coherent receiver employing dispersion-folded DBP. Beginning with block 802 of FIG. 8A, the communication link is virtually divided into a plurality of segments and dispersion steps. As described above, FIG. 6 illustrates an example of a short communication link that has been divided into a plurality of dispersion steps (along the y axis). As is shown in that figure, the communication link extends from a transmitter at the left side of the graph (i.e., distance=0) to a receiver at point A at the right side of the graph. Between the transmitter and the receiver in the example of FIG. 6 are fourteen spans, each comprising a first fiber along which dispersion increases and a second fiber along which dispersion decreases. Instead of the link being divided by distance steps that represent incremental lengths of the fibers, the link is divided into dispersion steps that represent ranges of accumulated dispersion. FIG. 6 explicitly identifies two such dispersion steps, a "first" and a "second" step. As can be appreciated from FIG. 6, a portion of each of the first three spans (counting from the receiver at point A) is contained within the first dispersion step and a portion of each of the first six spans is contained in the second dispersion step. Therefore, one or more of the spans of the communication link may have, at some point along its length, an amount of dispersion that falls within a given dispersion step of the dispersion map. The number of segments, M, and the number of dispersion steps, n, that the communication link is divided into depends upon various factors, such as the length of the link and the characteristics of the fibers used in the link. In some embodiments, the communication link can be assumed to comprise a single segment, in which case M=1.

Referring to block 804, the weighting factor, $W_i$, for each dispersion step is calculated in the manner described above. Next, with reference to block 806, an optical signal transmitted over the communication link is detected and sampled by the receiver. The "next" segment on which dispersion-folded DBP is to be performed can then be identified, as indicated in block 808. If the dispersion-folded DBP process has just begun, the next segment will be the first segment, i.e., the segment nearest the receiver.

At this point, lumped dispersion compensation is performed to obtain a waveform for the first dispersion step of the segment, as indicated in block 810. Referring back to FIG. 6 and assuming that dispersion-folded DBP is being performed on the first segment of the link, the lumped dispersion compensation compensates for the dispersion difference between the dispersion at the receiver (at point A) and the peak dispersion for the segment (at point B). Once the lumped dispersion has been performed, the "next" dispersion step can be identified, as indicated in block 812. If the dispersion-folded DBP process has just begun for the current segment, the next step will be the first step. With reference to block 814, nonlinearity compensation is performed for the dispersion step, with the Kerr nonlinearity (i.e., the nonlinearity within the portions of fiber in which the dispersion is within the dispersion range of the current step) being multiplied by W, for that dispersion step as shown in Equation (24). Referring next to block 816 of FIG. 8B, dispersion compensation is also performed for the dispersion step.

Figure 8B:
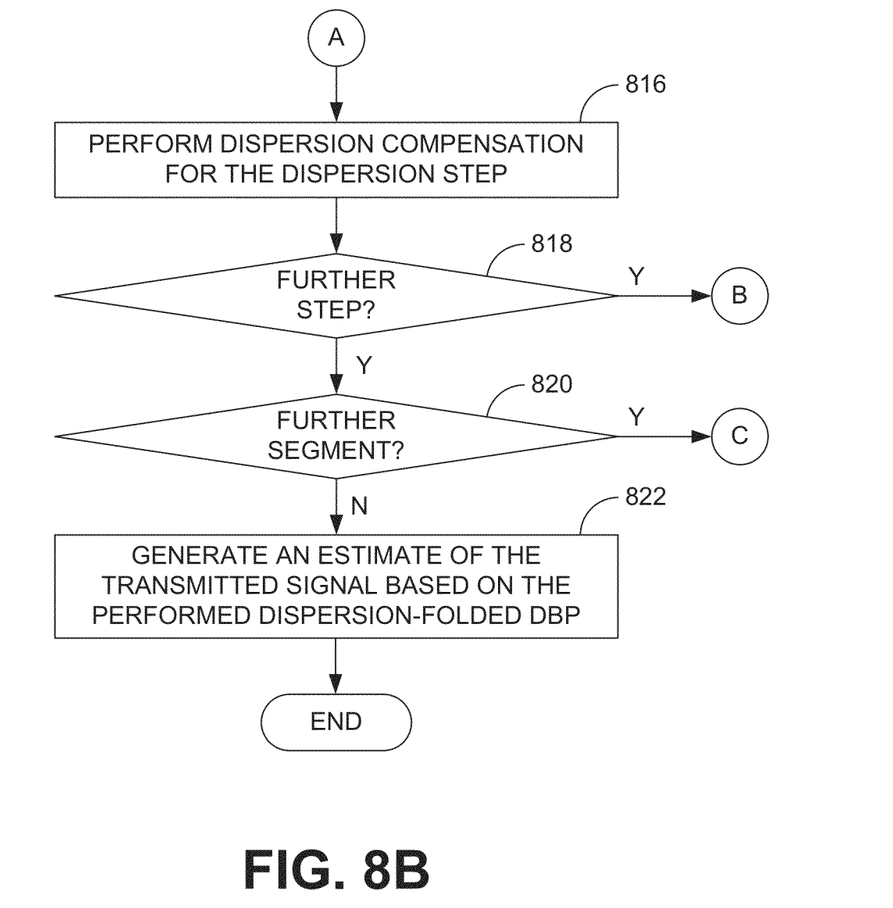

Flow from block 816 depends upon whether all dispersion steps of the segment have been considered. For example, FIG. 6 illustrates an example segment of a link that includes fourteen spans. The fiber portions within the top dispersion range are folded into the first step of DBP by the weighting factor $W_1$. There are 10 DBP steps in this example, corresponding to the 10 dispersion ranges defined by Equation (20) with n=10. This process continues until every dispersion step has been accounted for. In this example, the dispersion-folded DBP is performed from the step with maximum accumulated dispersion to the step with minimum dispersion. It is noted that according to the RDPS value and other system parameters, the optimum performance may be achieved using a different direction of DBP, e.g. from the step with minimum accumulated dispersion to the step with maximum dispersion. Once the dispersion and nonlinearity of the last dispersion step of the segment has been compensated, flow continues on to decision block 820 at which it is determined whether there are further segments to consider. If so, flow returns to block 808 and the above-described process is repeated for the next segment (i.e., next segment farther away from the receiver).

Flow continues in the manner described above until dispersion-folded DBP has been performed in relation to each segment of the communication link. At that time, flow continues to block 822 at which an estimate of the transmitted signal is generated based on the dispersion-folded DBP that had been performed on each segment. Such estimation can comprise matched filtering, clock recovery, and phase estimation.

Simulation Results for Dispersion-Folded DBP

Figure 9:
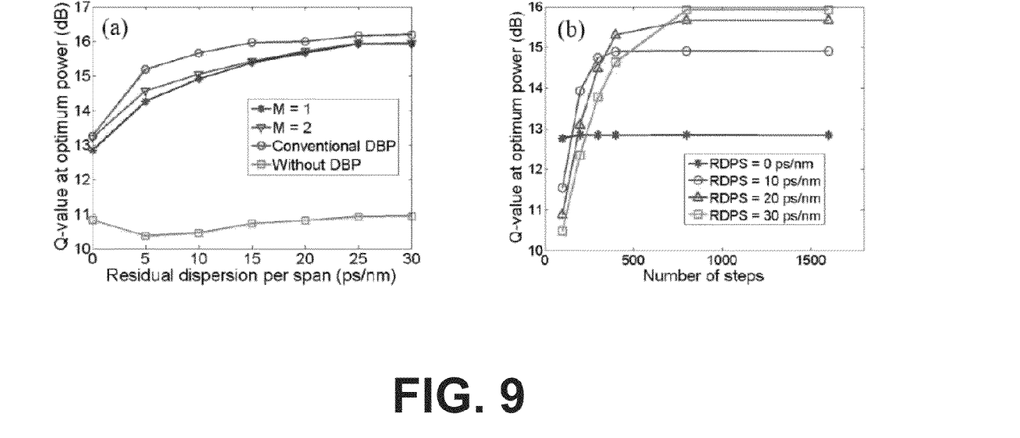

Dispersion-folded DBP was performed using the methodology described above. FIG. 9(a) shows the Q-values as functions of the RDPS after dispersion-folded DBP. Without loss of generality, the coupled LBSE was solved with the non-iterative asymmetric split-step Fourier method (SSFM) in DBP. The maximum Q-values were approached when the dispersion-folded DBP was performed in one segment. FIG. 9(b) shows the Q-values as functions of the step number. A larger step number is required when the RDPS is larger because the step size is dispersion limited. A larger RDPS means a larger difference between $D_{max}$ and $D_{min}$, resulting in a larger step number. When RDPS=30 ps/nm, the required step number was 800. In comparison with the conventional DBP, the computation for DBP was saved by a factor of 35 at a Q-value penalty of 0.3 dB. In comparison with the distance-folded DBP with a folding factor of 5, the computation was saved by a factor of 7 and the Q-value was increased by 0.6 dB.

Transmitter Side Impairment Compensation

Although the folded DBP has been described as being performed at the receiver, it is noted that folding the nonlinearity compensation of many spans into one span can also be applied to pre-compensation of fiber nonlinearity at the transmitter. In transmitter side impairment compensation, also known as impairment pre-compensation, the data signal (digital or analog) to be transmitted is first propagated in the digital domain in a virtual fiber whose dispersion and nonlinearity parameter are opposite to the physical transmission fiber. The resulting complex signal is modulated onto the optical carrier and transmitted in the physical transmission fiber to reach its destination. If no noise is present, the signal at the receiver will be identical to the data signal at the transmitter thus compensating all the fiber impairments.

Conclusion

Disclosed above are two efficient nonlinearity compensation methods for periodically dispersion-managed fiber system. With periodic dispersion management with RDPS=0, the linear and nonlinear behavior of the signal repeats itself in every dispersion period. Taking advantage this periodic behavior, DBP of many fiber spans can be folded into one span (distance-folded DBP). For fiber links with residual dispersion in each dispersion period, DBP can be folded according to the accumulated dispersion of each fiber section (dispersion-folded DBP).

Figure 11A:
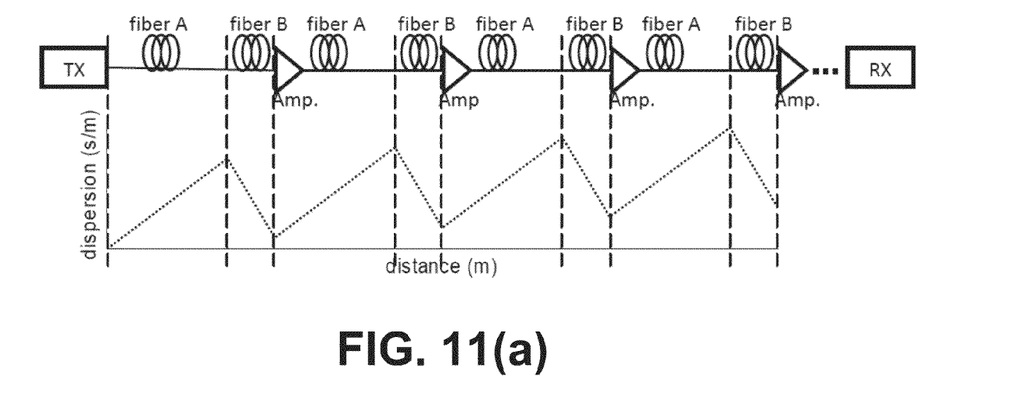
FIGS. 11(a)-11(c) are diagrams illustrating different configurations of dispersion management in which each fiber span comprising one dispersion period, each fiber span comprising multiple dispersion periods, and each dispersion period comprising multiple fiber spans, respectively.
Figure 11B:
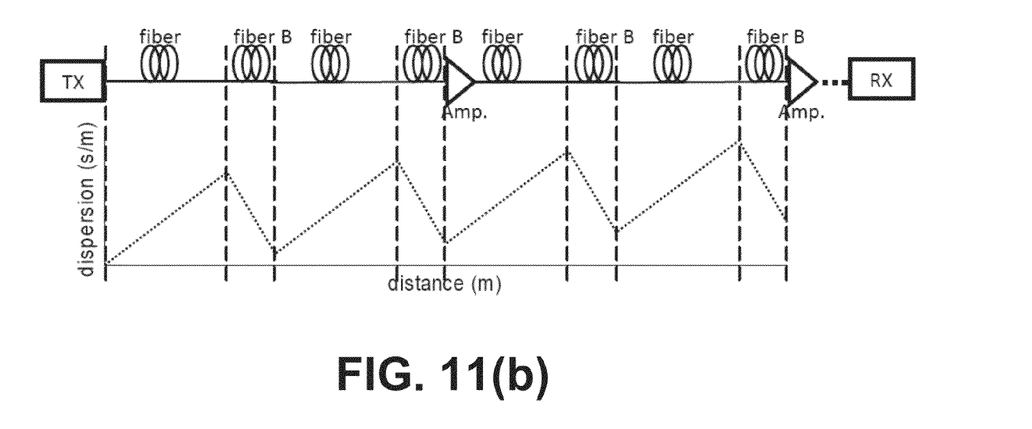
Figure 11C:
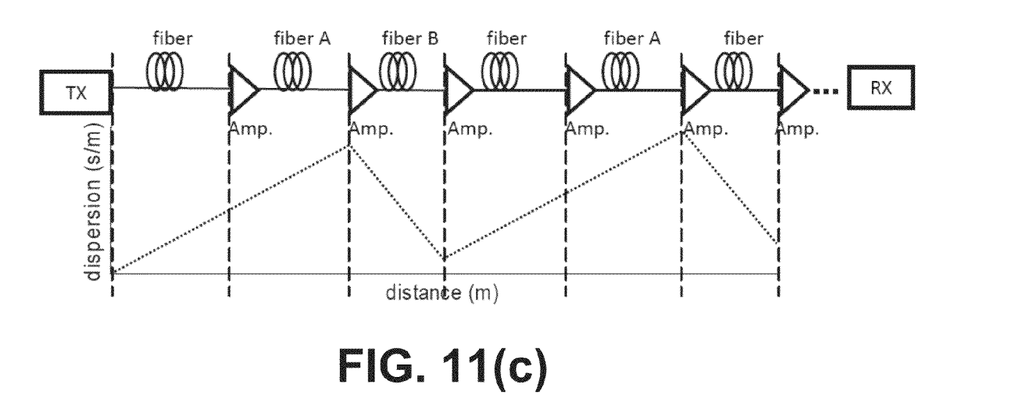

Although each amplified span was assumed to contain one period of the dispersion map, the folding factor can be further increased by shortening the dispersion map so that each amplified span comprises several dispersion periods. Folded DBP can also be applied when each dispersion period comprises several amplified spans. Various example configurations of dispersion management are illustrated in FIGS. 11(a)-11(c).

We claim:

1. A method for performing nonlinearity compensation on an optical signal that was transmitted over a dispersion-managed optical communication link, the method comprising:
a processor virtually dividing the communication link into one or more segments, each segment comprising a plurality of spans, and virtually dividing each span into a plurality of distance steps, each distance step representing a fraction of the length of its span; for each segment of the communication link:
performing lumped dispersion compensation on a received optical signal for a first group of spans of the segment to obtain a waveform upon which digital backward propagation (DBP) can be performed, performing DBP for a further span of the segment and performing lumped dispersion compensation for the remaining spans of the segment; and generating an estimate of the transmitted signal based upon the performed DBP.

2. The method of claim 1, wherein performing lumped dispersion compensation for a first group of spans of the segment comprises performing lumped dispersion compensation for a first half of the spans of the segments that is closest to a receiver that received the optical signal.

3. The method of claim 2, wherein performing DBP on a further span comprises performing DBP on a central span of the segment.

4. The method of claim 1, wherein performing DBP for a further span of the segment comprises performing dispersion compensation and nonlinearity compensation, with the nonlinearity multiplied by the number of spans in the segment, for each distance step of a subsequent span.

5. The method of claim 1, wherein each span comprises a first length of optical fiber having a first dispersion characteristic and a second length of optical fiber having an inverse dispersion characteristic.

6. A method for performing nonlinearity compensation on an optical signal that was transmitted over a dispersion-managed optical communication link, the method comprising:
a processor virtually dividing the communication link into one or more segments that each comprise a plurality of dispersion steps that represent particular ranges of accumulated dispersion of spans of the segment; for each segment of the communication link:
calculating a weighting factor for each dispersion step of the segment, the weighting factors accounting for different power levels across the segment; performing lumped dispersion compensation to obtain a waveform for a first dispersion step of the segment, and performing digital backward propagation (DBP) for each dispersion step of the segment with the nonlinearity being multiplied by the weighting factor for the dispersion step; and generating an estimate of the transmitted signal based upon the performed DBP.

7. The method of claim 6, wherein performing lumped dispersion compensation comprises performing dispersion compensation from the beginning of the segment to a first dispersion step of the segment.

8. A component for use in a dispersion-managed optical communication link, the component comprising:
logic configured to virtually divide the communication link into one or more segments, each segment comprising a plurality of spans, and to divide the spans into a plurality of distance steps, each distance step representing a fraction of the length of its span;
logic configured to perform lumped dispersion compensation on a received optical signal for a first group of spans of the segment to obtain a waveform upon which digital backward propagation (DBP) can be performed;
logic configured to perform DBP for a further span of the segment by performing dispersion compensation and nonlinearity compensation with the nonlinearity multiplied by the number of spans in the segment for each step of the span;
logic configured to perform lumped dispersion compensation for the remaining spans of the segment; and
logic configured to generate an estimate of the transmitted signal based upon the performed DBP.

9. The method component of claim 8, wherein the logic configured to perform lumped dispersion compensation for a first group of spans comprises logic configured to perform lumped dispersion compensation for a first half of the spans of the segments that is closest to a receiver that received the optical signal.

10. The component of claim 9, wherein the logic configured to performing DBP on a further span comprises logic configured to perform DBP on a central span of the segment.

11. The component of claim 8, wherein the component is part of a receiver of the optical communication link.

12. A component for use in a dispersion-managed optical communication link, the component comprising:
- logic configured to virtually divide the communication link into one or more segments that each comprise a plurality of dispersion steps that represent particular ranges of accumulated dispersion;
- logic configured to calculate a weighting factor for each dispersion step of a segment, the weighting factors accounting for different power levels across the segment;
- logic configured to perform lumped dispersion compensation to obtain a waveform for the first dispersion step,
- logic configured to perform digital backward propagation (DBP) for each dispersion step of the segment with the nonlinearity being multiplied by the weighting factor for the dispersion step; and
- logic configured to generate an estimate of the transmitted signal based upon the performed DBP.

13. The component of claim 12, wherein the logic configured to perform lumped dispersion compensation comprises logic configured to perform dispersion compensation from the beginning of the segment to a first dispersion of the segment.

14. The component of claim 12, wherein the component is part of a receiver of the optical communication link.

* * * * *